Nov. 4, 1958

W. E. MARTIN 2,858,950

HEAVY DUTY BED RAMP TRAILER

Filed May 18, 1956

INVENTOR.
William E. Martin,
BY Brown, Jackson,
Boettcher & Dienner
Attys.

Nov. 4, 1958 W. E. MARTIN 2,858,950
HEAVY DUTY BED RAMP TRAILER
Filed May 18, 1956 6 Sheets-Sheet 5

INVENTOR.
William E. Martin,
BY Brown, Jackson,
Boettcher & Dienner

Nov. 4, 1958

W. E. MARTIN 2,858,950

HEAVY DUTY BED RAMP TRAILER

Filed May 18, 1956

INVENTOR.
William E. Martin,
BY Brown, Jackson,
Boettcher & Dienner
Attys.

United States Patent Office 2,858,950
Patented Nov. 4, 1958

2,858,950

HEAVY DUTY BED RAMP TRAILER

William E. Martin, Kewanee, Ill., assignor, by mesne assignments, to Hyster Company, Portland, Oreg., a corporation of Nevada Application May 18, 1956, Serial No. 585,863

20 Claims. (Cl. 214—505)

The present invention relates to trailers, and more particularly to heavy duty trailers for hauling large machinery, such as tractors, cranes, concrete mixers, road rollers and the like.

The load carrying portion of my improved trailer is supported at its front end on the fifth wheel mounting of a power driven tractor truck, and is supported at its rear end on a wheeled truck.

The improved trailer may be of the platform type or of the beam type. In the platform type, the load carrying portion of the trailer is in the form of a platform on which the crawler treads or wheels of the load vehicle rest in the transportation of the load vehicle. In the beam type, the load carrying portion of the trailer is in the form of a longitudinally extending beam structure which is brought to bear against the undersides of the axles or against the underside of the frame of the load vehicle at points between the crawler treads or wheels of such vehicle.

The general object of the present invention is to provide an improved hydraulically actuated lifting and lowering mechanism between the rear end of the load carrying portion of the trailer and the rear wheeled truck, which lifting and lowering mechanism will permit the load carrying portion to be lowered into direct contact with the ground so as to be of minimum height above the ground and thereby facilitate the operation of moving the load machine onto and off of the load carrying portion of the trailer. This hydraulically actuated lifting and lowering mechanism also enables the rear end of the load carrying portion to be temporarily lowered and held in a load carrying position in immediate proximity to the ground, spaced possibly one or two inches from the ground, for enabling the upper part of the load machine to pass under viaducts and other low structures. After passing under such a low structure, the load carrying portion of the trailer is restored to its conventional traveling height above the ground.

Another object of the invention is to provide such a trailer having the above described hydraulically actuated lifting and lowering mechanism located at its rear end, and having a folding gooseneck draft attachment located at its front end. The gooseneck is adapted for draft attachment to the fifth wheel mounting of a tractor truck, and this gooseneck is of the type which can be folded out in extended flatwise position in contact with the ground to function as an inclined ramp along which the load machine can be driven in moving such machine up onto the load carrying portion of a trailer or in moving it down off the trailer.

Other objects, features and advantages of the invention will appear from the following detail description of certain preferred embodiments thereof. In the accompanying drawings illustrating such embodiments.

The trailer is designated 20 in its entirety and comprises a load carrying bed 21 supported at its front end on a power driven tractor truck 22 and supported at its rear end on a wheeled truck 23, the latter preferably being of the tandem wheeled type. The load carrying bed 21 may be either of the platform type or of the beam type, the former type being shown. This bed comprises a plurality of parallel I-beams 24 which are cross connected by transverse beams 25. In the beam type of trailer there are usually only two of these I-beams 24, disposed sufficiently close together to enable them to fit in between the right and left wheels or crawler treads of the load vehicle for supporting the load vehicle on its axles or frame. In the platform type of trailer there are usually two additional I-beams 24' (Figure 3) spaced outwardly from the two centrally disposed I-beams 24 in order to form a platform of sufficient width to support the wheels or crawler treads of the load vehicle. In the platform type of trailer a decking is formed by longitudinal timbers 27 lying between the I-beams 24 and 24'.

Figures 2, 3:
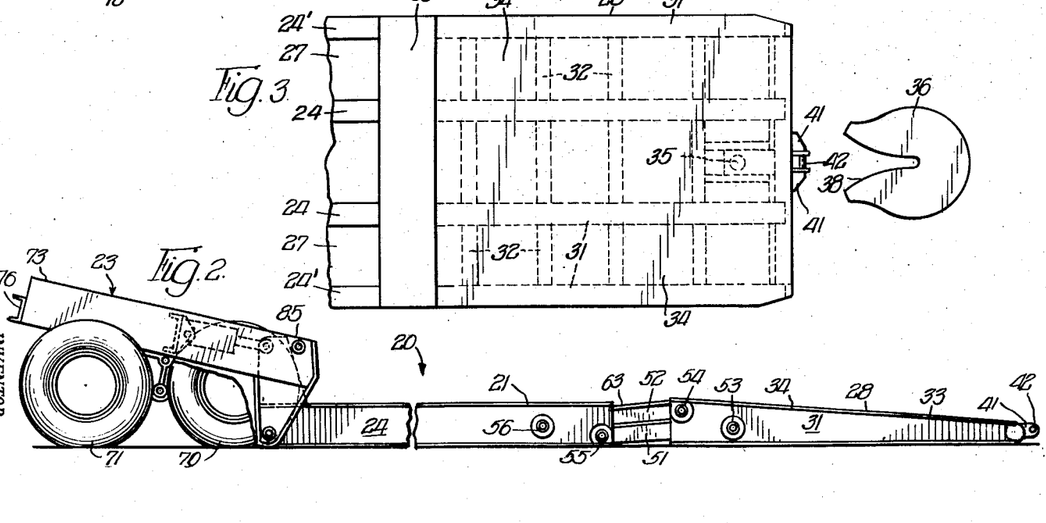
Figure 2 is a similar view showing the trailer bed resting on the ground in loading or unloading position.
Figure 3 is a fragmentary plan view of the folding gooseneck draft attachment, and of the fifth wheel mounted on the tractor truck, and adapted for connection therewith.

The front end of the trailer 20 is supported on the tractor truck 22 by a folding gooseneck type of supporting and hitch attachment 28. As shown in Figure 3, this comprises a plurality of longitudinally extending beams 31 cross connected by transverse beams 32, these making up a draft tongue 33. Tread plates 34 complete the top surface of this draft tongue 33 to enable it to be used as a ramp, as will be presently described. Extending downwardly from the front portion of the tongue 33 is a removable hitch pin 35 which is adapted to effect releasable coupling engagement with a fifth wheel 36 mounted on the rear of the tractor truck 22. This fifth wheel 36 is mounted for fore and aft tilting movement on a transverse pivot axis 37, and is formed with a tapering slot 38 leading from its rear periphery up to its center. The hitch pin 35 is adapted to slide up this slot 38 and to be locked at the inner end of the slot by suitable locking means, well known to those skilled in the art. Projecting from the front edge of the tongue 33 are spaced brackets 41 and extending between these brackets is a round lifting bar 42. This lifting bar is adapted to be engaged by a cable hook 43 secured to the end of a hoisting cable 44 which winds upon a conventional power driven hoist or windlass 45 supported on the truck tractor 22 in front of the fifth wheel 36. The winding of the cable 44 on the windlass 45 is operative to swing the gooseneck folding hitch up to its raised position and to lift the trailer bed to load carrying position, meanwhile drawing the releasable hitch pin 35 up into locking engagement in the slot 38 of the fifth wheel 36.

The tongue 33 of the folding gooseneck draft hitch is pivotally connected with the load carrying bed 21 by a system of approximately parallel links 51, 52. The upper ends of the links 51 and 52 are pivotally mounted on transverse pivot shafts 53 and 54 extending through the tongue 33 from side to side, and the lower ends of these links are pivotally mounted on transverse pivot shafts 55 and 56 extending through the front end of the bed 21 from side to side. There are approximately two or more pairs of these front and rear links 51 and 52 spaced across the width of the tongue 33. The centers of the pivot shafts 53—56 are so located and the lengths of the front and rear links 51 and 52 are so proportioned that the tongue 33 can be swung down into a position substantially in prolongation of the front end of the trailer bed 21, substantially as shown in Figure 2.

If desired, locking means may be provided for locking the substantially parallel links 51, 52 in the form of a rigid assembly when the gooseneck hitch tongue 33 is raised into its load transporting position. This locking means comprises locking links 58 which have their lower or front ends pivotally mounted on the lower front pivot shaft 55 carried by bed 21, and which have their upper rear ends formed with locking notches 59. These locking notches 59 are adapted to hook over transverse pins or shafts 61 carried by the upper portions of rear links 52. When the hitch tongue 33 has been raised into its load transporting position shown in Figure 1 the notched ends 59 of the locking links 58 can be hooked over the locking pins or shafts 61, thereby locking the parallel link assembly against fore and aft swinging movement which may otherwise result from the accelerating and braking forces occurring between the trailer 20 and tractor truck 22 during forward or rearward travel. Springs 62 may be provided for releasably holding the locking notches 59 in engagement with locking pins 61, these locking notches being released from the locking pins when the hitch tongue 33 is to be folded down substantially in prolongation of the front end of the trailer bed 21. In the platform type of trailer, the upper or back edges of the rear links 52 are joined by tread plates 63 to bridge the space between the tread plates 34 on the draft tongue 33 and the decked surface 27 of the trailer bed 21. The general construction of the above described folding gooseneck hitch connection 28 has been disclosed in my prior United States Patents Nos. 2,441,710, 2,471,277, 2,605,916, 2,611,496, 2,656,195 and 2,687,225, to which attention is directed for further details of this folding gooseneck hitch connection.

Referring now to the rear truck 23, this is preferably of the tandem wheeled type comprising front and rear wheels 70, 71, arranged in tandem relation, there preferably being two pairs of these tandem wheels disposed side by side at the right side and at the left side of the truck 23, although a greater or lesser number of tandem pairs may be provided, depending upon the intended load carrying capacity of the trailer. Extending longitudinally between these right and left hand pairs of tandem wheels 70, 71 is a truck frame 73 comprising inwardly facing side channels 74 which are joined together transversely by an intermediate channel 75, a rear channel 76 and a front cross plate 77, all welded to the outer side channels 74.

The tandem wheels 70, 71 are mounted on a tandem axle assembly 81 which permits fore and aft oscillation between the front and rear tandem wheels and permits transverse oscillation between the right and left hand pairs of tandem wheels, such oscillatable tandem axle assembly being old and well known, as exemplified in my prior Patents 2,456,719 and 2,749,141. The truck frame 73 is mounted for fore and aft tilting on the tandem axle assembly 81 through bearing brackets 82 extending down from the truck frame and having pivotal connection with the tandem axle assembly on transverse pivot bolts 83, which are shown as being disposed intermediate and below the axes of the tandem wheels 70, 71.

Referring now to my improved hydraulically actuated lifting and lowering mechanism which connects the bed 21 of the trailer with the tandem wheeled truck 23, this mechanism is indicated in its entirety at 85 and connects the front end of the wheeled truck frame 23 with the two adjacent or centrally disposed I-beams 24 of the trailer bed 21. In the beam type of trailer these two I-beams 24 constitute the entire load carrying bed of the trailer; in the platform type of trailer these two centrally disposed I-beams 24 are supplemented by two or more additional beams disposed outside of the centrally 24' disposed I-beams 24 in order to provide a platform of sufficient width to support the wheels or crawler treads of the load vehicle.

Extending downwardly from each front corner of the truck frame 73 are pivotal bracket arms 86 which have their lower portions pivotally connected to the two I-beams 24 of the trailer bed by transverse pivot pins 87. This pivotal connection, which is disposed substantially in the horizontal plane of the trailer bed 21, permits the truck frame 73 to swing from its upper position in which it is substantially in parallelism with the I-beams 24, shown in Figure 1, into its downwardly and forwardly tilting position in which it is at an angle to the I-beams 24, shown in Figure 2.

Figure 6:
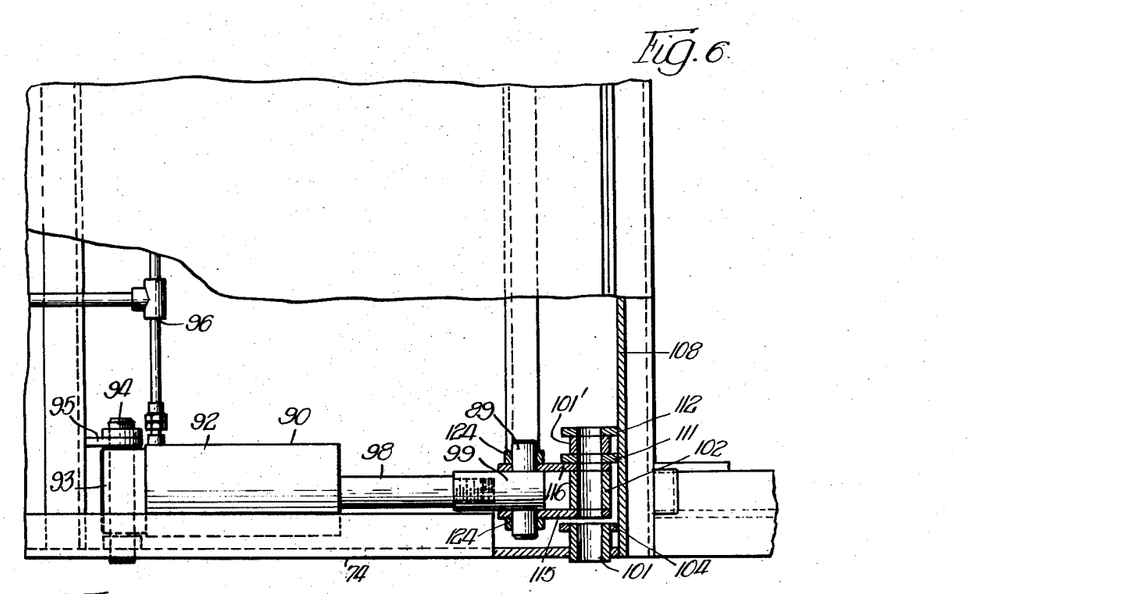
Figure 6 is a substantially horizontal sectional view taken approximately on the plane of the line 6—6 of Figure 4.

Extending upwardly from the rear ends of the two I-beams 24, at points on the inner sides of the pivotal bracket arms 86, are power operated arms 88 which are pivotally connected by pivot pins 89 with hydraulic rams 90. This relation of power operated bracket arm 88 and hydraulic ram 90 is duplicated at each side of the trailer, each hydraulic ram comprising a cylinder 92 having a pivot eye 93 at its rear end which engages over a transverse pivot pin 94. As shown in Figure 6, each pivot pin 94 is mounted at one end in the truck frame side channel 74 and is mounted at its other end in a plate 95 which is welded to the web of the transverse journal 75. The two cylinders 92 at opposite sides of the truck frame are connected through piping 96 with the hydraulic pump and control valve arrangement located either on the rear truck 23 or on the tractor truck 22. Each cylinder 92 contains a piston which connects through a piston rod 98 with a pivot eye 99 engaging over the transverse pivot pin 89 mounted in the upper end of the power operated bracket arm 88. When the two cylinders 92 are energized by hydraulic liquid under pressure the separating pressure between the pivot pins 89 and 94 pushes the power operated bracket arms 88 relatively forwardly and the truck frame 73 relatively rearwardly around the lower hinge pins 87. This elevates the trailer bed 21 and tilts the truck frame 73 backwardly and rearwardly substantially into parallelism with the I-beams 24 of the trailer bed. In this position the trailer is in transport. The trailer is adapted to be locked in this position by inserting locking pins 100 from each side of the trailer into holes 101 in the truck frame 73 which are then in alignment with holes 102 in the power operated bracket arms 88, as will be presently described.

Figure 4:
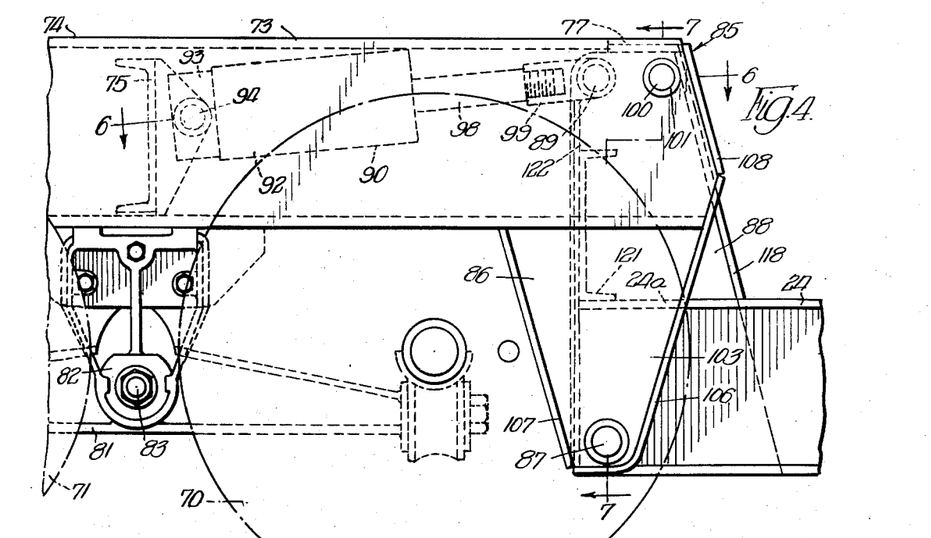
Figure 4 is a fragmentary side view of the hydraulically actuated lifting and lowering mechanism operative between the trailer bed and the rear wheeled truck, showing the trailer in its raised transport position.
Figure 5:
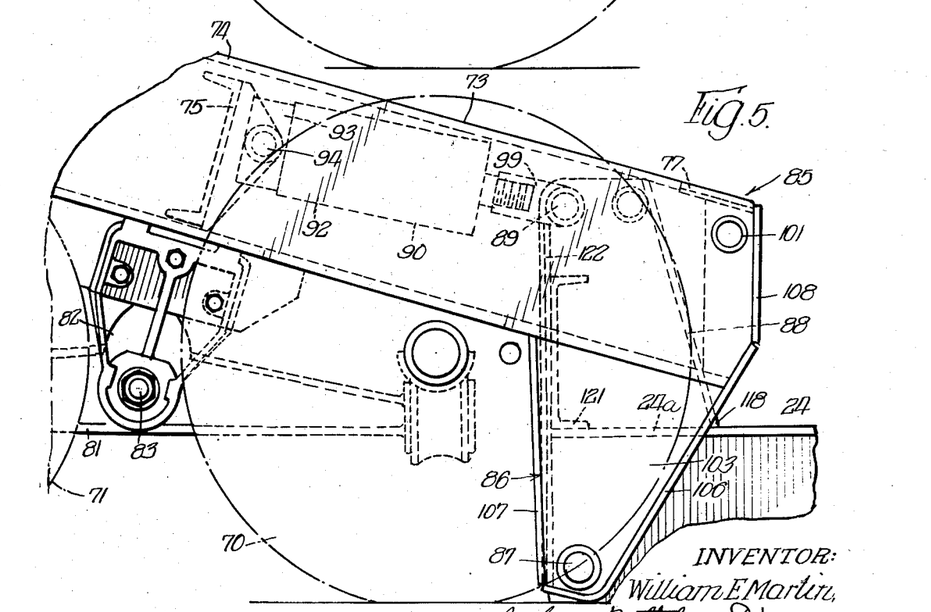
Figure 5 is a similar view showing the trailer lowered to its loading and unloading position.
Figure 7:
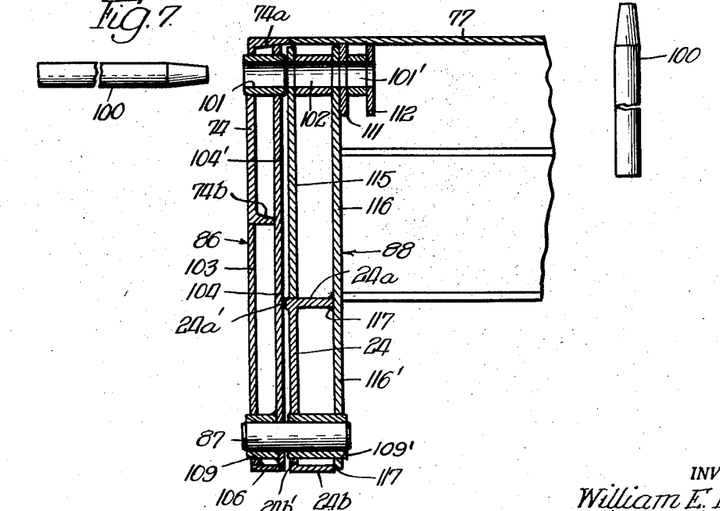
Figure 7 is a substantially vertical sectional view taken approximaately on the plane of the line 7—7 of Figure 4.

Referring now to one preferred construction of the pivotal bracket arms 86 and of the power operated bracket arms 88, it will be seen from Figure 7 that each pivotal bracket arm 86 comprises laterally spaced outer and inner plates 103 and 104 which are welded to the truck frame channel 74. The outer plate 103 is of triangular shape, and is welded to the bottom flange 74b of the frame channel 74. This bottom flange 74b of channel 74 has its inner edge cut off in the locality of the bracket arm 86, and the inner plate 104 has a lower portion which conforms substantially to the triangular shape of the outer plate 103, and which lower portion is welded to the cut-off edge of the flange 74b. In addition, this inner plate 104 has an upper portion 104' which extends upwardly and is welded to the underside of upper flange 74a of frame channel 74. The lower portions of these outer and inner bracket plates 103 and 104 are maintained at a constant spacing by front and rear metallic strips 106 and 107 (Figure 4) which are welded to the bracket plates 103 and 104, the front strip 106 being curved in under the lower end of the bracket arm. Welded across the entire front face of the truck frame 73 above the upper ends of the front strips 106 is a front plate 108. A pivot eye 109 for receiving the pivot pin 87 is welded to the lower portions of the bracket side plates 103 and 104. Welded between the upper front portion of the frame channel 74 and the upper plate portion 104' is the outer thimble or locking bushing 101 for receiving the locking pin 100. In alignment with this outer thimble or bushing 101, but spaced inwardly therefrom, is an inner thimble or bushing 101', and between these outer and inner thimbles is adapted to move the power operated bracket arm 88. The inner thimble 101' is welded between two plates or brackets 111, 112 which have their upper edges welded to the transverse upper plate 77 and which have their front edges welded to the transverse front plate 108.

Each power operated bracket arm 88 comprises laterally spaced outer and inner plates 115 and 116 which are welded to the adjacent I-beam 24 of the trailer bed 21. The outer plate 115 is of triangular shape and has its lower edge welded to the top of the I-beam 24. The inner plate 116 has an upper portion extending up to substantially the same height as the outer plate 115 but it also has a lower portion 116' which extends down the entire depth of the I-beam 24. This lower portion 116' is welded at 117 to the inner edges of the top and bottom flanges 24a and 24b of the I-beam. A cylindrical tubular pivot eye 109' is welded between the lower portion of the I-beam 24 and the lower end of the plate portion 116', in alignment with the outer pivot eye 109, this pair of pivot eyes receiving the transverse pivot pin 87. The outer flanges of the I-beam 24 are cut off at 24a' and 24b' at the rear end of the I-beam to enable the pivotal bracket arm 86 to be positioned in close proximity to the web of the I-beam. The front edge of the outer plate 115 and the front edge of the upper portion of inner plate 116 are joined together by a front metallic strip 118 which is welded to both plates and which extends down to the top of the I-beam 24. The rear ends of the longitudinal beams 24 of the trailer bed are cross connected by a transverse channel 121 (Figure 4) which is welded to the top flanges 24a of the I-beams 24. A rear metallic joining strip 122 is welded to the plates 115, 116 and to the cross channel 121 and adjacent I-beam 24.

Figure 1:
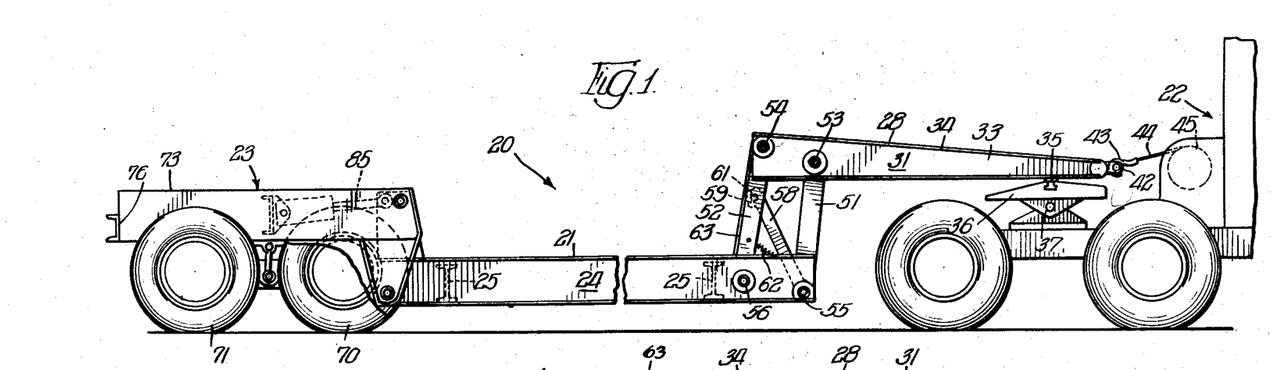
Figure 1 is a fragmentary side elevational view of one embodiment of my improved trailer in transport position.

As shown in Figure 6, the piston rod pin 89 of the hydraulic cylinder passes through aligned apertures in the upper rear corner of the bracket arm plates 115, 116, which aligned apertures are reinforced by bearing rings 124, 124 welded to the outer sides of the plates 115, 116. Also as shown in Figure 6, the locking bushing 102 is welded between the upper front corners of the plates 115, 116, in position where it will register with the stationary frame bushings 101, 101' when the rear ends of the I-beams 24 have been lifted to their normal load carrying positions, as shown in Figure 1. At this time, the locking pins 100 are inserted into the aligned locking holes 101, 101', 102 at each side of the trailer.

In the operation of the above described embodiment, the locking links 58 of the parallel link system 51, 52 are released; the hitch pin 35 is released from locking engagement in the slot 38 of the fifth wheel 36; and the cable hook 43 is hooked to the lifting bar 42 at the front end of the hitch tongue 33. The tractor truck 22 is then driven forwardly while the cable 44 is paid out, whereby the front end of the trailer bed 21 is lowered to the ground and whereby the folding gooseneck hitch attachment 28 is folded out in extended flatwise position in contact with the ground, as shown in Figure 2. Either prior or subsequent to this lowering of the front end of the trailer bed 21, the rear end of the trailer bed is also lowered into contact with the ground. This is accomplished by removing the locking pins 100 from the locking holes 101, 101' and 102 and then gradually releasing the hydraulic liquid from the lifting cylinders 92, whereupon the trailer truck frame 73 tilts downwardly and forwardly to lower the rear ends of the I-beams 24 into contact with the ground. The trailer bed 21 is thus in its lowest possible position, with both the front and rear ends of the bed I-beams 24 resting on the ground. In the case of a platform type of trailer, the load vehicle is then driven up the inclined ramp established by the folding gooseneck hitch attachment 28 extending out at the front end of the trailer, the load vehicle being brought to rest in load carrying position on the trailer platform. In the case of a beam type of trailer, the load vehicle is driven over the extended gooseneck hitch attachment 28 and is also driven over the I-beams 24 into load carrying position with respect to the trailer bed, with the crawler treads or wheels of the load vehicle remaining in contact with the ground. Thereupon, with either type of trailer, the trailer bed 21 is then brought up to transport position by first raising either the front end or the rear end, or raising both ends simultaneously. The front end is raised by connecting the cable hook 43 to the lifting bar 42 and then winding the hoisting cable 44 upon the power driven windlass 45, thereby swinging the draft tongue 33 upwardly and moving the hitch pin 35 into the upper end of the tapering slot 38, whereupon the hitch pin 35 is locked at the inner end of the slot 38, and whereupon the locking links 58 are hooked over the locking pins 61. The rear end of the trailer bed is raised by energizing the hydraulic cylinders 92 with liquid under pressure, resulting in the power actuated bracket arms 88 being thrust forwardly and the trailer frame 73 being moved rearwardly, with consequent upward lifting of the rear end of the trailer bed into the transport position shown in Figures 1 and 4. The transversely extending frame plate 108 functions as a limiting stop for limiting the relative forward movement of the bracket arms 88 in the trailer lifting operation. When the rear end of the trailer bed is in its fully elevated position it is locked in such position by inserting the locking pins 100 through the aligned locking holes 101, 101' and 102. For passing under low viaducts or under other obstructions where the top of the vehicle being transported would not quite clear the obstruction, it is possible to obtain several inches of additional clearance by lowering the rear end of the trailer bed to a position where it just clears the ground. This is accomplished by removing the locking pins 100 and releasing hydraulic liquid from the lifting cylinders 92 to a point where the rear end of the trailer bed just clears the ground. The hydraulic cylinders can sustain the load until after the low obstruction has been passed. Under these circumstances, it is also possible to lower the front end of the trailer bed to a position just clear of the ground by sustaining the load of the front end of the trailer through the hoisting cable 44. The operation of lowering the trailer bed and removing the load vehicle therefrom is merely the reverse of the loading operation, and will be apparent from the foregoing description.

Figure 8:
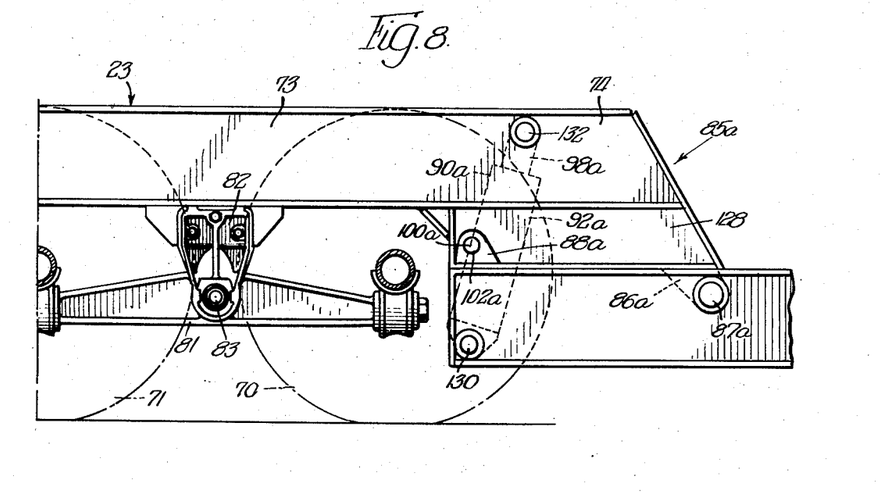
Figures 8 and 9 are views similar to Figures 4 and 5 of a modified construction.
Figure 9:
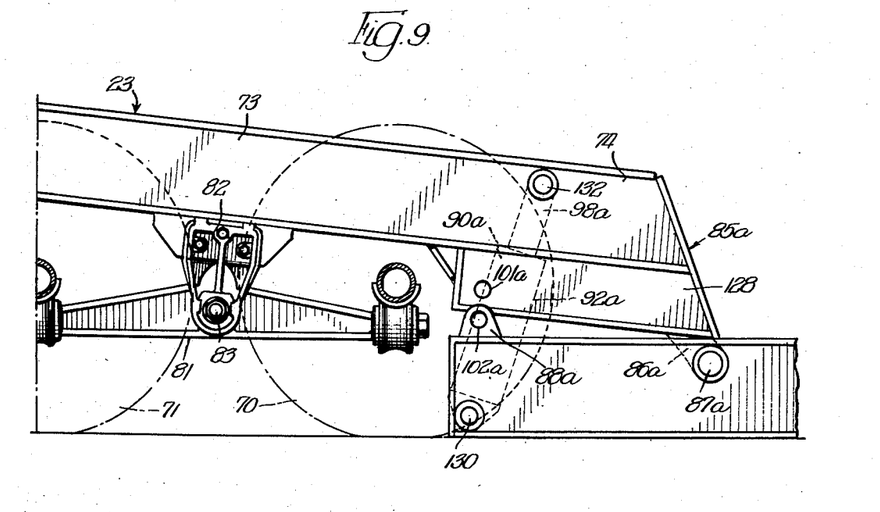

In Figures 8 and 9 I have shown my improved trailer as being provided with a modified construction of hydraulically actuated lifting and lowering mechanism 85a between the rear end of the trailer bed 21 and the rear wheeled truck 23. In this modified construction a short length of beam structure 128 is secured to the front end of the truck frame 73 at each side thereof to extend parallel with the side channels 74, these beam sections being preferably secured to the side channels by welding. Each of these beam sections 128 may be of T section or channel section, or may be made up of plates.

Extending downwardly from the front end of each beam section 128 is a pivotal bracket arm 86a which has pivotal connection with the I-beams 24 of the trailer bed by transverse pivots 87a. The pivots 87a may consist of separate pivot pins for each bracket arm 86a, or may consist of a single pivot shaft extending across the width of the trailer for pivoting the plurality of bracket arms 86a. In this embodiment the hydraulic rams 90a are disposed in a generally upright relation with each cylinder 92a pivotally connected at 130 to the lower rear corner of the adjacent I-beam 24. The piston rod 98a is pivotally connected by pivot pin 132 to the upper portion of truck frame 73. In the operation of lifting the trailer bed 21 from loading position to transport position, hydraulic liquid is introduced into each cylinder 92a upon the back side of the piston for drawing the two pivot pins 130 and 132 toward each other. This raises the trailer bed and rocks the truck frame 73 into substantial parallelism therewith, the upper limit of movement of the bed frame being defined by the engagement of the top sides of the I-beams 24 against the bottom sides of the beam sections 128. Extending upwardly from each I-beam 24 is a locking bracket arm 88a having a locking hole 102a therein which is adapted to align with locking hole 101a in beam section 128 when the trailer bed is in transport position. When the holes 101a and 102a are thus in alignment the trailer bed is locked in transport position by inserting the locking pin 100a through these holes. This modified construction has the same folding gooseneck type of hitch attachment 28, previously described.

Figure 10:
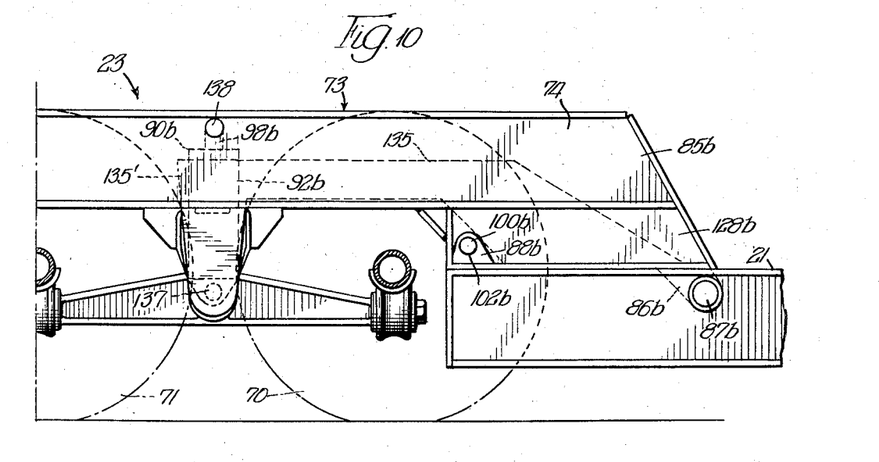
Figures 10 and 11 are views similar to Figures 4 and 5 of a second modified construction.
Figure 11:
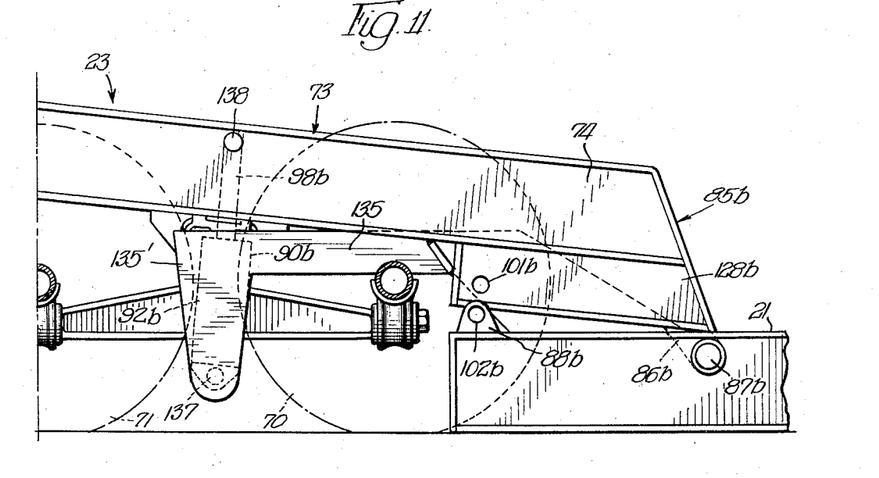

In Figures 10 and 11 I have illustrated another modified construction of hydraulically operated lifting and lowering mechanism 85b. The construction has the same relation of beam sections 128b and bracket arms 86b pivoted to the trailer I-beams 24 by pivot pin 87b; and it also has the same relation of locking bracket arms 88b and locking holes 101b, 102b, and locking pin 100b as above described. However, in this embodiment the trailer bed 21 is provided with long rearwardly projecting extension levers 135 for connection with the hydraulic lifting rams 90b. These levers 135 have forward attaching portions which are welded or riveted to the trailer I-beams 24. At their rear ends, these levers have downwardly extending arms 135' located about midway of the length of the truck frame 73. The cylinders 92b of the hydraulic rams 90b are pivoted by pivot pins 137 to the lower ends of the downwardly extending arms 135'. The piston rods 98b are pivoted by pivot pins 138 to the truck frame 73. Release of hydraulic pressure from the back sides of the pistons allows the truck frame 73 to tilt downwardly and forwardly around the rocker pivots 83, and allows the trailer bed 21 to lower into contact with the ground. Energization of the hydraulic cylinders 92b pulls the truck frame back to level position and raises the trailer bed to transport position, in which position it is locked by the locking pins 100b. This modified construction likewise has the same folding gooseneck draft attachment 28 previously described.

Figure 12:
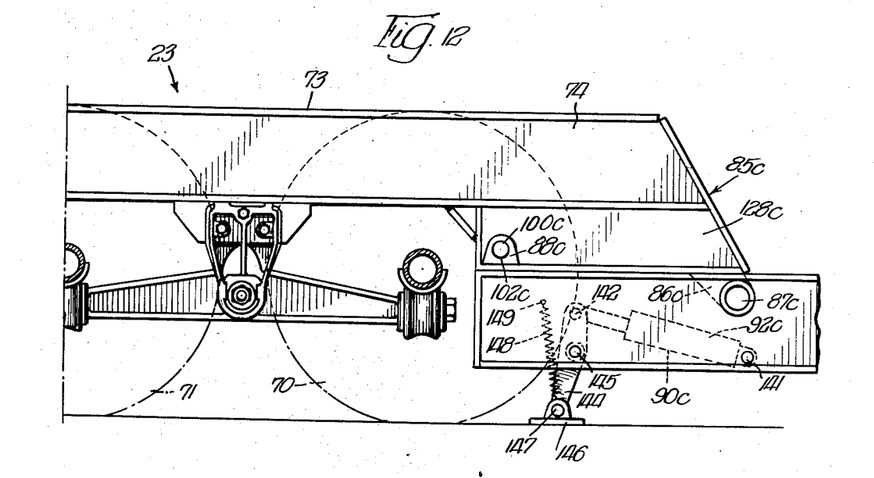
Figures 12 and 13 are views similar to Figures 4 and 5 of a third modified construction.
Figure 13:
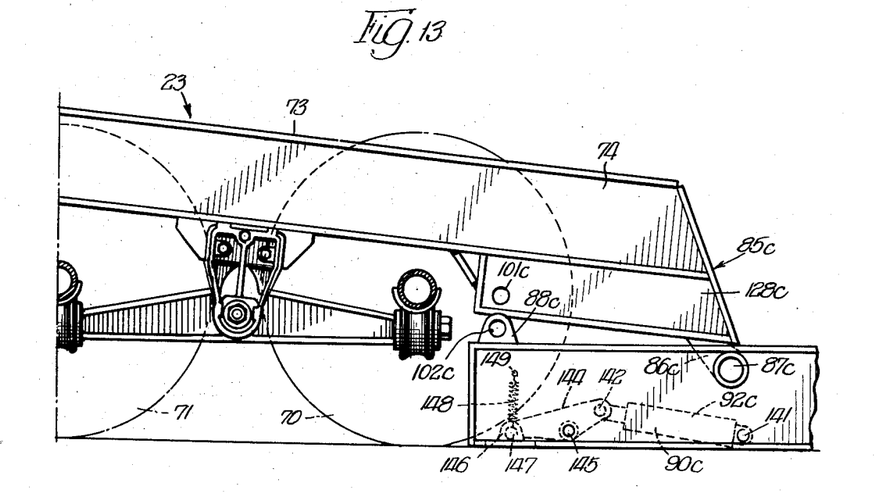

In Figures 12 and 13 I have shown a further modification which has the same relation of beam sections 128c and bracket arms 86c pivoted to the trailer I-beams 24 by pivot pins 87c; and which has the same relation of locking bracket arms 88c and locking holes 101c, 102c and locking pins 100c, as above described. In this modified embodiment the hydraulic rams 90c are carried by the trailer bed 21, extending generally lengthwise thereof on the inner sides of the I-beams 24. The cylinders 92c are pivoted by pivot pins 141 to the I-beams 24. The piston rods are pivotally connected by pivot pins 142 to the upper arms of lifting levers 144. These lifting levers are pivoted intermediate their ends on pivots 145 carried by the I-beams 24. The lower arms of the lifting levers 144 have pressure plates 146 pivoted thereto on pivot pins 147. Tension springs 148 are connected between the pressure plates 147 and pins 149 on the I-beam 24, these springs normally tending to swing the lifting levers up into their retracted positions in the trailer bed, as illustrated in Figure 13.

When the trailer bed is to be lowered to the loading and unloading position, the cylinders 92c are energized to swing the lifting levers 144 and pressure plates 146 down into engagement with the ground, thereby taking the weight of the trailer off of the locking pins 100c. These pins are now removed, whereupon the hydraulic pressure is slowly released from the cylinders 92c. Thus, the bed frame 21 is gradually lowered down into loading or unloading position in contact with the ground, the folding gooseneck draft attachment 28 at the front end of the trailer bed being also folded out flat in contact with the ground. To raise the trailer bed to transport position, the cylinders 92c are again energized to swing the lifting levers 144 downwardly, thereby raising the trailer bed and swinging the truck frame into parallelism therewith, whereupon the locking pins 100c can be re-inserted into the holes 101c, 102c. Upon the locking of the two frames in transport position, the hydraulic fluid is released from the cylinders 92c so as to allow the lifting levers 144 to swing up to transport positions clear of the ground.

In each of the above described embodiments, the hydraulically actuated lifting and lowering or "kick-up" mechanism 85 is preferably combined with a folding gooseneck type of supporting and hitch attachment 28 at the front end of the trailer. However, my invention also contemplates modified constructions wherein a removable gooseneck or other types of hitch connections may be substituted for the folding gooseneck 28.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a trailer for hauling load vehicles and the like, the combination of a trailer bed, a folding gooseneck draft attachment at the front of said trailer bed for effecting draft connection with a tractor vehicle, said folding gooseneck draft attachment being adapted to be folded out flat in contact with the ground preparatory to having the load vehicle loaded or unloaded over said draft attachment and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame and transverse pivot means joining the lower portions of said pivotal bracket arms with said trailer bed, said pivotal connection permitting said trailer to move from a transport position in which said trailer bed and truck frame lie substantially in parallelism down into a loading position in which said truck frame is tilted downwardly and forwardly and said trailer bed rests on the ground, and hydraulic ram means operative to raise said trailer from said loading position to said transport position.

2. In a trailer for hauling load vehicles and the like, the combination of a trailer bed, a folding gooseneck draft attachment at the front end of said trailer bed for effecting draft connection with a tractor vehicle, said folding gooseneck draft attachment being adapted to be folded out flat in contact with the ground preparatory to having the load vehicle loaded or unloaded over said draft attachment and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame and transverse pivot means joining said pivotal bracket arms with said trailer bed, said trailer normally occupying a transport position in which said truck frame and trailer bed lie in substantial parallelism with said trailer bed raised above the ground, said pivotal connection permitting said trailer to move from said transport position into a loading position in which said truck frame is tilted downwardly and forwardly and said trailer bed rests on the ground, hydraulic ram means mounted on said wheeled truck operative to raise said trailer from said loading position to said transport position, and locking means for locking said truck frame and the rear end of said trailer bed in transport position.

3. In a trailer for hauling load vehicles and the like, the combination of a trailer bed, a folding gooseneck hitch connection at the front end of said trailer bed for effecting hitch attachment with a tractor vehicle, said folding gooseneck hitch connection being adapted to be folded out in contact with the ground preparatory to having the load vehicle loaded or unloaded over said hitch connection and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame, and pivots joining said pivotal bracket arms with said trailer bed substantially in the horizontal plane of said trailer bed, said trailer normally occupying a transport position in which said truck frame and said trailer bed lie in substantially horizontal positions with said trailer bed raised above the ground, said pivotal connection permitting said trailer to move from said transport position into a loading position in which said truck frame is tilted downwardly and forwardly and said trailer bed rests on the ground, hydraulic ram means operative to raise said trailer from said loading position to said transport position, locking bracket arms extending upwardly from the rear portion of said trailer bed, locking apertures in said locking bracket arms adapted to register with a locking aperture in said truck frame when the trailer is in transport position, and locking pins adapted to be inserted into said registering locking apertures.

4. In a trailer for hauling load vehicles and the like, the combination of a trailer bed, a folding gooseneck hitch connection at the front end of said trailer bed for effecting hitch attachment with a tractor vehicle, said folding gooseneck hitch connection being adapted to be folded out in contact with the ground preparatory to having the load vehicle loaded or unloaded over said hitch connection and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame, and pivots joining said pivotal bracket arms with said trailer bed, said trailer normally occupying the transport position in which said truck frame and said trailer bed lie in substantially horizontal positions with said trailer bed raised above the ground, said pivotal connection permitting said trailer to move from said transport position into a loading position in which said truck frame is tilted downwardly and forwardly and said trailer bed rests on the ground, and hydraulic ram means mounted on said wheeled truck and extending substantially lengthwise of said truck frame and operatively connected between said truck frame and said trailer bed for raising said trailer from said loading position to said transport position.

5. In a trailer for hauling load vehicles and the like, the combination of a trailer bed, a folding gooseneck hitch connection at the front end of said trailer bed for effecting hitch attachment with a tractor vehicle, said folding gooseneck hitch connection being adapted to be folded out in contact with the ground preparatory to having the load vehicle loaded or unloaded over said hitch connection and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame, and pivots joining said pivotal bracket arms with said trailer bed, said trailer normally occupying the transport position in which said truck frame and said trailer bed lie in substantially horizontal positions with said trailer bed raised above the ground, said pivotal connection permitting said trailer to move from said transport position into a loading position in which said truck frame is tilted downwardly and forwardly and said trailer bed rests on the ground, power operated bracket arms extending upwardly from the rear end of said trailer bed, and hydraulic ram means mounted on said wheeled truck and extending substantially longitudinally of said truck frame and operatively connected between said truck frame and said power operated bracket arms, said hydraulic ram means being operative to raise said trailer from said loading position to said transport position.

6. In a trailer for hauling load vehicles and the like, the combination of a trailer bed, a folding gooseneck hitch connection at the front end of said trailer bed for effecting hitch attachment with a tractor vehicle, said folding gooseneck hitch connection being adapted to be folded out in contact with the ground preparatory to having the load vehicle loaded or unloaded over said hitch connection and the front end of the trailer bed, a wheeled truck for supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame, and pivots joining said pivotal bracket arms with said trailer bed, said trailer normally occupying the transport position in which said truck frame and said trailer bed lie in substantially horizontal positions with said trailer bed raised above the ground, said pivotal connection permitting said trailer to move from said transport position into a loading position in which said truck frame is tilted downwardly and forwardly and said trailer bed rests on the ground, power operated bracket arms extending upwardly from the rear end of said trailer bed, hydraulic ram means extending substantially longitudinally of said truck frame and operatively connected between said truck frame and said power operated bracket arms, said hydraulic ram means being operative to raise said trailer from said loading position to said transport position, locking apertures in said truck frame adapted to register with locking apertures formed in said power operated bracket arms when said trailer is in transport position, and locking pins adapted to be inserted in said registering locking apertures.

7. In a trailer of the class described, the combination of a trailer bed comprising a plurality of longitudinally extending I-beams, means for supporting the front end of said trailer bed on a tractor vehicle, a wheeled truck supporting the rear end of said trailer bed comprising pairs of front and rear tandem truck wheels and a truck frame pivotally supported for fore and aft tilting movement on said tandem wheels, pivotal bracket arms secured to the front end of said truck frame and extending downwardly therefrom, pivot pins establishing a pivotal connection between the lower ends of said pivotal bracket arms and the rear ends of said trailer bed I-beams which permits the trailer to be lowered into loading position with said truck frame tilted downwardly and forwardly with said I-beams resting on the ground, power operated bracket arms extending upwardly and forwardly and with said I-beams resting on the of said pivotal bracket arms, hydraulic rams each comprising a cylinder element and a piston element extending substantially longitudinally of said truck frame, means pivotally connecting one of said ram elements with said truck frame at a point substantially midway of the length of said truck frame, means for pivotally connecting the other of said ram elements with one of said power operated bracket arms, said hydraulic rams being operative to raise said trailer from loading position to transport position, locking apertures in certain of said bracket arms adapted to register with other locking apertures in said trailer when said trailer is in transport position, and locking pins adapted to be inserted in said registering locking apertures.

8. In a trailer for hauling load vehicles and the like, the combination of a trailer bed, a folding gooseneck draft attachment at the front end of said trailer bed for effecting draft connection with a tractor vehicle, said folding gooseneck draft attachment being adapted to be folded out flat in contact with the ground preparatory to having the load vehicle loaded or unloaded over said draft attachment and the front end of the trailer bed, a wheeled truck for supporting the rear end of said trailer bed, said wheeled truck comprising pairs of front and rear tandem truck wheels and a truck frame pivotally supported for fore and aft tilting movement on said tandem wheels, pivotal bracket arms extending downwardly from the front end of said truck frame, pivot pins between said pivotal bracket arms and said trailer bed establishing a pivotal axis therebetween which permits the trailer bed to be lowered into loading position in contact with the ground and with the truck frame tilted downwardly and forwardly relatively thereto, and hydraulic rams located to the rear of said pivotal axis and operatively connected between said truck frame and said trailer bed for moving said trailer from said loading position upwardly into transport position.

9. In a trailer for hauling load vehicles and the like, the combination of a trailer bed, disconnectable means for supporting the front end of said trailer bed on a tractor vehicle, a wheeled truck supporting the rear end of said trailer bed comprising truck wheels and a truck frame pivotally supported for fore and aft tilting movement on said truck wheels, pivotal bracket arms extending downwardly from the front end of said truck frame, pivot pins joining the lower portions of said pivotal bracket arms with said trailer bed establishing a transverse pivotal axis therebetween substantially in the horizontal plane of said trailer bed which permits said trailer bed to be lowered into loading position in contact with the ground and with the truck frame tilted downwardly and forwardly relatively thereto, hydraulic rams extending substantially vertically in rear of said transverse pivotal axis and having their upper ends pivotally connected to said truck frame and their lower ends pivotally connected to said trailer bed, and means for locking said trailer bed and truck frame together in transport position.

10. In a trailer for hauling load vehicles and the like, the combination of a trailer bed, means for supporting the front end of said trailer bed on a tractor vehicle, a wheeled truck supporting the rear end of said trailer bed comprising truck wheels and a truck frame pivotally supported for fore and aft tilting movement on said truck wheels, pivot means connecting the front end of said truck frame with the rear end of said trailer bed and establishing a transverse pivot axis therebetween substantially in the horizontal plane of said trailer bed which permits said trailer bed to be lowered into loading position in contact with the ground with the truck frame tilted downwardly and forwardly relatively thereto, and hydraulic rams disposed substantially rearwardly of said transverse pivot axis and operatively connected between said truck frame and said trailer bed for lifting said trailer bed from loading position to transport position.

11. In a trailer for hauling load vehicles and the like, the combination of a trailer bed, means for supporting the front end of said trailer bed on a tractor vehicle, a wheeled truck supporting the rear end of said trailer bed comprising truck wheels and a truck frame pivotally supported for fore and aft tilting movement on said truck wheels, pivot means connecting the front end of said truck frame with the rear end of said trailer bed and establishing a transverse pivot axis therebetween substantially in the horizontal plane of said trailer bed which permits said trailer bed to be lowered into loading position in contact with the ground with the truck frame tilted downwardly and forwardly relatively thereto, and substantially horizontally extending hydraulic rams disposed substantially in rear of said transverse pivot axis and operatively connected between said truck frame and said trailer bed for moving said trailer bed upwardly from loading position to transport position.

12. In a trailer for hauling load vehicles and the like, the combination of a trailer bed, means for supporting the front end of said trailer bed on a tractor vehicle, a wheeled truck supporting the rear end of said trailer bed comprising truck wheels and a truck frame pivotally supported for fore and aft tilting movement on said truck wheels, pivot means connecting the front end of said truck frame with the rear end of said trailer bed and establishing a transverse pivot axis therebetween substantially in the horizontal plane of said trailer bed which permits said trailer bed to be lowered into loading position in contact with the ground with the truck frame tilted downwardly and forwardly relatively thereto, and substantially vertically extending hydraulic rams disposed substantially in rear of said transverse pivot axis and operatively connected between said truck frame and said trailer bed for raising said trailer bed from loading position to transport position.

13. In a trailer for hauling load vehicles and the like, the combination of a trailer bed, a folding gooseneck draft attachment at the front end of said trailer bed for effecting draft connection with a tractor vehicle, said folding gooseneck draft attachment being adapted to be folded out flat in contact with the ground preparatory to having the load vehicle loaded or unloaded over said draft attachment and the front end of the trailer bed, a wheeled truck for supporting the rear end of said trailer bed, said wheeled truck comprising pairs of front and rear tandem wheels, a tandem axle structure between said wheels, a truck frame mounted on said tandem axle structure for fore and aft pivotal movement about a transverse rocking axis intermediate the axes of said front and rear tandem wheels, pivotal bracket arms extending downwardly from the front end of said truck frame, pivot pins connecting said pivotal bracket arms with said trailer bed and establishing a transverse pivot axis therebetween which permits said trailer bed to be lowered into loading position in contact with the ground, with the truck frame tilted downwardly and forwardly relatively thereto, arms extending rearwardly from said trailer bed substantially to the vertical plane of the transverse rocking axis of said truck frame, and substantially vertically extending hydraulic rams operatively connected between the rear ends of said arms and said truck frame and operative to lift said trailer bed from loading position to transport position.

14. In a trailer of the class described, the combination of a trailer bed, means for supporting the front end of said trailer bed on a tractor vehicle, a wheeled truck supporting the rear end of said trailer bed comprising truck wheels and a truck frame pivotally supported for fore and aft tilting movement on said truck wheels, pivot means between the front end of said truck frame and the rear portion of said trailer bed establishing a transverse pivotal axis therebetween in the horizontal plane of said trailer bed which permits said trailer bed to be lowered into loading position in contact with the ground, arms extending rearwardly from said trailer bed and substantially to an intermediate portion of said truck frame, and substantially vertically extending hydraulic rams operatively connected between the rear ends of said latter arms and said truck frame and operative to lift said trailer bed from loading position to transport position.

15. In a trailer for hauling load vehicles and the like, the combination of a trailer bed, a folding gooseneck draft attachment at the front end of said trailer bed for effecting draft connection with a tractor vehicle, said folding gooseneck draft attachment being adapted to be folded out flat in contact with the ground preparatory to having the load vehicle loaded or unloaded over said draft attachment and the front end of the trailer bed, a wheeled truck supporting the rear end of said trailer bed comprising pairs of front and rear tandem truck wheels and a truck frame pivotally supported for fore and aft tilting movement on said tandem wheels, pivotal bracket arms secured to the front end of said truck frame and extending downwardly therefrom, pivot pins between said pivotal bracket arms and said trailer bed establishing a transverse pivotal axis therebetween which permits said trailer bed to be lowered into loading position in contact with the ground with the truck frame tilted downwardly and forwardly relatively thereto, lifting levers pivotally mounted on the rear end of said trailer bed, hydraulic rams mounted on said trailer bed and operatively connected with said lifting levers for swinging said levers downwardly into contact with the ground for exerting an upward lifting force on the rear end of the trailer bed to lift the trailer bed from loading position to transport position, and locking means locking the trailer bed and truck frame together in transport position.

16. In a trailer of the class described, the combination of a trailer bed, means for supporting the front end of said trailer bed on a tractor vehicle, a wheeled truck supporting the rear end of said trailer bed comprising truck wheels and a truck frame pivotally supported for fore and aft tilting movement on said truck wheels, pivot means connecting the front end of said truck frame with the rear end of said trailer bed and establishing a transverse pivot axis therebetween substantially in the horizontal plane of said trailer bed which permits said trailer bed to be lowered into loading position in contact with the ground, lifting levers pivotally mounted on the rear end of said trailer bed, and hydraulic rams mounted on said trailer bed and operatively connected with said lifting levers for swinging said levers downwardly into engagement with the ground to thereby lift said trailer bed from loading position to transport position.

17. In a trailer of the class described, the combination of a trailer bed, said trailer bed being disposed in a single plane, pivotal means for supporting the front end of said trailer bed on a tractor vehicle, a wheeled truck supporting the rear end of said trailer bed, said wheeled truck comprising pairs of front and rear tandem wheels, a tandem axle structure between said wheels, a truck frame, rocking pivots tiltably supporting said truck frame on said tandem axle structure for fore and aft rocking movement about a transverse pivot axis disposed substantially in the horizontal plane of and intermediate the axes of said tandem wheels, a pivotal connection between the front end of said truck frame and the rear end of said trailer bed comprising pivotal bracket arms extending downwardly from the front end of said truck frame and transverse pivot means joining said pivotal bracket arms with said trailer bed to establish a transverse pivot axis therebetween substantially in the horizontal plane of said trailer bed, said pivotal connection permitting said trailer to move from a transport position in which said trailer bed and truck frame lie substantially in parallelism down into a loading position in which said truck frame is tilted downwardly and forwardly and said trailer bed rests on the ground, and hydraulic ram means operative to raise said trailer from said loading position to said transport position.

18. In a trailer of the class described, the combination of a trailer bed, said trailer bed being disposed in a single plane, pivotal means for supporting the front end of said trailer bed on a tractor vehicle, a wheeled truck supporting the rear end of said trailer bed, said wheeled truck comprising truck wheels and a truck frame tiltably supported for fore and aft tilting movement relatively to said truck wheels, a pivotal connection between the front end of said truck frame and the rear end of said trailer bed comprising pivotal bracket arms extending downwardly from the front end of said truck frame and transverse pivot means joining the lower portions of said pivotal bracket arms with said trailer bed to establish a transverse pivot axis therebetween substantially in the horizontal plane of said trailer bed, said pivotal connection permitting said trailer to move from a transport position in which said trailer bed and truck frame lie substantially in parallelism down into a loading position in which said truck frame is tilted downwardly and forwardly and said trailer bed rests on the ground, hydraulic ram means operative to raise said trailer from said loading position to said transport position, and locking means for locking said truck frame and the rear end of said trailer bed in transport position.

19. In a trailer of the class described, the combination of a trailer bed, means for supporting the front end of said trailer bed on a tractor vehicle, a wheeled truck supporting the rear end of said trailer bed comprising pairs of front and rear tandem truck wheels and a truck frame pivotally supported for fore and aft tilting movement on said tandem wheels, a pivotal connection between the front end of said truck frame and the rear end of said trailer bed comprising pivotal bracket arms extending downwardly from the front end of said truck frame, and pivots joining said pivotal bracket arms with said trailer bed, said trailer normally occupying a transport position in which said truck frame and said trailer bed lie in substantially horizontal positions with said trailer bed raised above the ground, said pivotal connection permitting said trailer to move from said transport position into a loading position in which said truck frame is tilted downwardly and forwardly and said trailer bed rests on the ground, hydraulic ram means operative to raise said trailer bed from said loading position to said transport position, locking bracket arms extending upwardly from the rear portion of said trailer bed, locking apertures in said locking bracket arms adapted to register with locking apertures in said truck frame when the trailer is in transport position, and locking pins adapted to be inserted into said registering locking apertures.

20. In a trailer of the class described, the combination of a trailer bed, means for supporting the front end of said trailer bed on a tractor vehicle, a wheeled truck for supporting the rear end of said trailer bed, said wheeled truck comprising pairs of front and rear tandem truck wheels and a truck frame pivotally supported for fore and aft tilting movement on said tandem wheels, pivotal bracket arms extending downwardly from the front end of said truck frame, pivot pins between said pivotal bracket arms and said trailer bed establishing a pivotal axis therebetween which permits the trailer bed to be lowered into loading position in contact with the ground and with the truck frame tilted downwardly and forwardly relatively thereto, and hydraulic rams located to the rear of said pivotal axis and operatively connected between said truck frame and said trailer bed for moving said trailer bed from said loading position upwardly into transport position.

References Cited in the file of this patent

UNITED STATES PATENTS

| | | |
|---|---|---|
| 2,605,916 | Martin | Aug. 5, 1952 |
| 2,687,225 | Martin | Aug. 24, 1954 |
| 2,706,059 | Parker | Apr. 12, 1955 |
| 2,759,737 | Manning | Aug. 21, 1956 |